(12) United States Patent
Ichikawa et al.

(10) Patent No.: US 10,634,247 B2
(45) Date of Patent: Apr. 28, 2020

(54) PISTON STRUCTURE FOR ENGINE

(71) Applicant: MAZDA MOTOR CORPORATION, Hiroshima (JP)

(72) Inventors: Kazuo Ichikawa, Hiroshima (JP); Osamu Aoki, Higashi-Hiroshima (JP); Takashi Ikai, Higashi-Hiroshima (JP); Kouichi Nakano, Hiroshima (JP); Yoshiyuki Koga, Hiroshima (JP); Shinichi Fujimaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/776,537

(22) PCT Filed: Oct. 25, 2016

(86) PCT No.: PCT/JP2016/081582
§ 371 (c)(1),
(2) Date: May 16, 2018

(87) PCT Pub. No.: WO2017/086103
PCT Pub. Date: May 26, 2017

(65) Prior Publication Data
US 2018/0335140 A1    Nov. 22, 2018

(30) Foreign Application Priority Data

Nov. 17, 2015    (JP) .................................. 2015-224709

(51) Int. Cl.
*F16J 1/16*    (2006.01)
*F02F 3/00*    (2006.01)
(Continued)

(52) U.S. Cl.
CPC ................... *F16J 1/16* (2013.01); *F02F 3/00* (2013.01); *F02F 3/0076* (2013.01);
(Continued)

(58) Field of Classification Search
CPC .... F02F 3/02; F02F 3/0076; F02F 3/04; F02F 3/26; F02F 3/00; F02F 3/0084; F16J 1/16
See application file for complete search history.

(56) References Cited

U.S. PATENT DOCUMENTS 5,063,893 A    11/1991    Iwaya
5,634,189 A    5/1997    Rossmann et al.
(Continued)

FOREIGN PATENT DOCUMENTS

CN    103047411 A    4/2013
CN    104350265 A    2/2015
(Continued)

OTHER PUBLICATIONS

International Search Report issued in PCT/JP2016/081582; dated Dec. 20, 2016.

*Primary Examiner* — Abiy Teka
(74) *Attorney, Agent, or Firm* — Studebaker & Brackett PC

(57) ABSTRACT

Disclosed is an engine piston structure including an outer peripheral portion (6) formed along an outer shape of a piston (1), and having a predetermined thickness, a pair of piston pin supporters (7) having peripheral walls (7b) having a predetermined thickness, and couplers (8) each coupling the pair of the piston pin supporters (7) to the outer peripheral portion (6). The outer peripheral portion (6) and the peripheral walls (7b) of the piston pin supporters (7) are solid. Each of the coupler (8) is porous. The outer peripheral portion (6), the piston pin supporters (7), and the couplers (8) are made of a metal material and are integrally formed together.

5 Claims, 12 Drawing Sheets

(51) Int. Cl.
*F02F 3/02* (2006.01)
*F02F 3/26* (2006.01)

(52) U.S. Cl.
CPC ............. *F02F 3/0084* (2013.01); *F02F 3/02* (2013.01); *F02F 3/26* (2013.01)

(56) References Cited

U.S. PATENT DOCUMENTS

| | | | | |
|---|---|---|---|---|
| 6,240,828 B1 * | 6/2001 | Fujimoto | ................... | F02F 3/02 92/214 |
| 6,318,243 B1 | 11/2001 | Jones | | |
| 8,720,405 B2 * | 5/2014 | Golya | ....................... | F02F 3/02 123/193.4 |
| 2015/0204268 A1 | 7/2015 | Sasaki | | |

FOREIGN PATENT DOCUMENTS

| | | |
|---|---|---|
| DE | 4122089 C1 | 4/1992 |
| JP | S60-191654 A | 9/1985 |
| JP | S63-174553 U | 11/1988 |
| JP | H02-095756 A | 4/1990 |
| JP | H02-149852 U | 12/1990 |
| JP | 2013-164028 A | 8/2013 |

\* cited by examiner

PISTON STRUCTURE FOR ENGINE

TECHNICAL FIELD

The present invention relates to a piston structure for an engine.

BACKGROUND ART

Conventionally, it has been known that enhancing the thermally insulating property of a combustion chamber in an engine leads to a reduction in cooling loss, thereby improving thermal efficiency of the engine. For example, according to Patent Document 1, a porous, thermally insulating material having a certain level of a thermal property is used for the top of the engine in order to thermally insulate the combustion chamber.

CITATION LIST

Patent Document

[Patent Document 1] Japanese Unexamined Patent Publication No. 2013-164028

SUMMARY OF THE INVENTION

Technical Problem

In order to achieve significantly improved, high thermal efficiency of an engine, it is necessary to increase a proportion of a combustion pressure rise to a change in a crank angle (hereinafter referred to as "the combustion pressure rise rate") or the maximum value of a combustion pressure.

However, if the combustion pressure rise rate or the maximum value of the combustion pressure is increased, a problem of noise vibration harshness ("NVH") such as engine vibration or engine noise becomes significant.

The present disclosure is conceived in view of the above problems, and attempts to provide an engine piston structure capable of reducing NVH even if a combustion pressure rise rate or the maximum value of a combustion pressure is increased.

Solution to the Problem

To achieve the above attempt, the present invention is directed to a piston structure for an engine. This engine piston structure includes: an outer peripheral portion formed along an outer shape of the piston, and having a predetermined thickness; a pair of piston pin supporters substantially cylindrically shaped, and having peripheral walls with a predetermined thickness, the piston pin supporters supporting a piston pin of which both ends are inserted into insertion holes defined by the peripheral walls of the pair of the piston pin supporters; and couplers each coupling the pair of piston pin supporters to the outer peripheral portion. The outer peripheral portion and the peripheral walls of the piston pin supporters are solid, each of the couplers has a porous structure in which hollow portions are formed, and the outer peripheral portion, the pair of piston pin supporters, and the couplers are made of a metal material and are integrally formed together.

According to this configuration, the porous structure of the couplers can reduce the weight of the piston, and the hollow portions of the couplers can absorb vibration and noise during the operation of the piston. The outer peripheral portion and the peripheral walls of the pair of the piston pin supporters are set to have respective thicknesses enough to be able to reduce the weight of the piston as much as possible while keeping the shape of the piston and supporting the piston pin. This can reduce the weight of the piston as much as possible while maintaining the necessary function of the piston. Furthermore, the reduced weight of the piston increases a resonance frequency, thereby reducing generation of vibration and noise caused by resonance. Therefore, even if a combustion pressure rise rate or the maximum value of a combustion pressure in the engine is increased, the NVH of the engine can be reduced.

In one preferred embodiment of the engine piston structure, each of the couplers has a hollow honeycomb structure.

This can enhance strength and rigidity of the coupler even if the coupler is porous, thereby making it possible to improve the supporting rigidity of the piston pin supporters for the outer peripheral portion. As a result, the rigidity of the entire piston can be ensured.

If the couplers have the hollow honeycomb structure, it is preferable that each of the couplers supporting the piston pin supporters on the outer peripheral portion include a plurality of radial extensions extending radially from the peripheral walls of the piston pin supporters toward the outer peripheral portion, at least one of the radial extensions of each of the couplers has the hollow honeycomb structure, and the hollow honeycomb structure of the radial extensions be disposed such that honeycomb holes serving as the hollow portions extend in a direction in which the radial extensions extend.

This can further enhance strength and rigidity of the radial extensions having the hollow honeycomb structure, thereby making it possible to further improve the supporting rigidity of the piston pin supporters for the outer peripheral portion. In addition, it is possible to reduce the weight of the radial extensions, i.e., the weight of the piston while improving strength and rigidity of the radial extensions.

In one preferred embodiment of the engine piston structure, a sound absorber is provided below the pair of piston pin supporters and the couplers, and has a structure in which hollow portions are arranged in a body-centered cubic lattice or a face-centered cubic lattice.

This can further reduce noise during the operation of the piston while reducing the weight of the piston.

Advantages of the Invention

As can be seen from the foregoing description, according to the engine piston structure of the present invention, the outer peripheral portion and the peripheral walls of the pair of the piston pin supporters are solid, and the couplers coupling the pair of the piston pin supporters to the outer peripheral portion have a porous structure in which hollow portions are formed, and the outer peripheral portion, the piston pin supporters, and the couplers are made of a metal material and are integrally formed together. This can reduce the weight of the piston as much as possible while maintaining the necessary function of the piston. Therefore, even if a combustion pressure rise rate or the maximum value of a combustion pressure in the engine is increased, the NVH of the engine can be reduced.

DESCRIPTION OF EMBODIMENT

Figure 1:
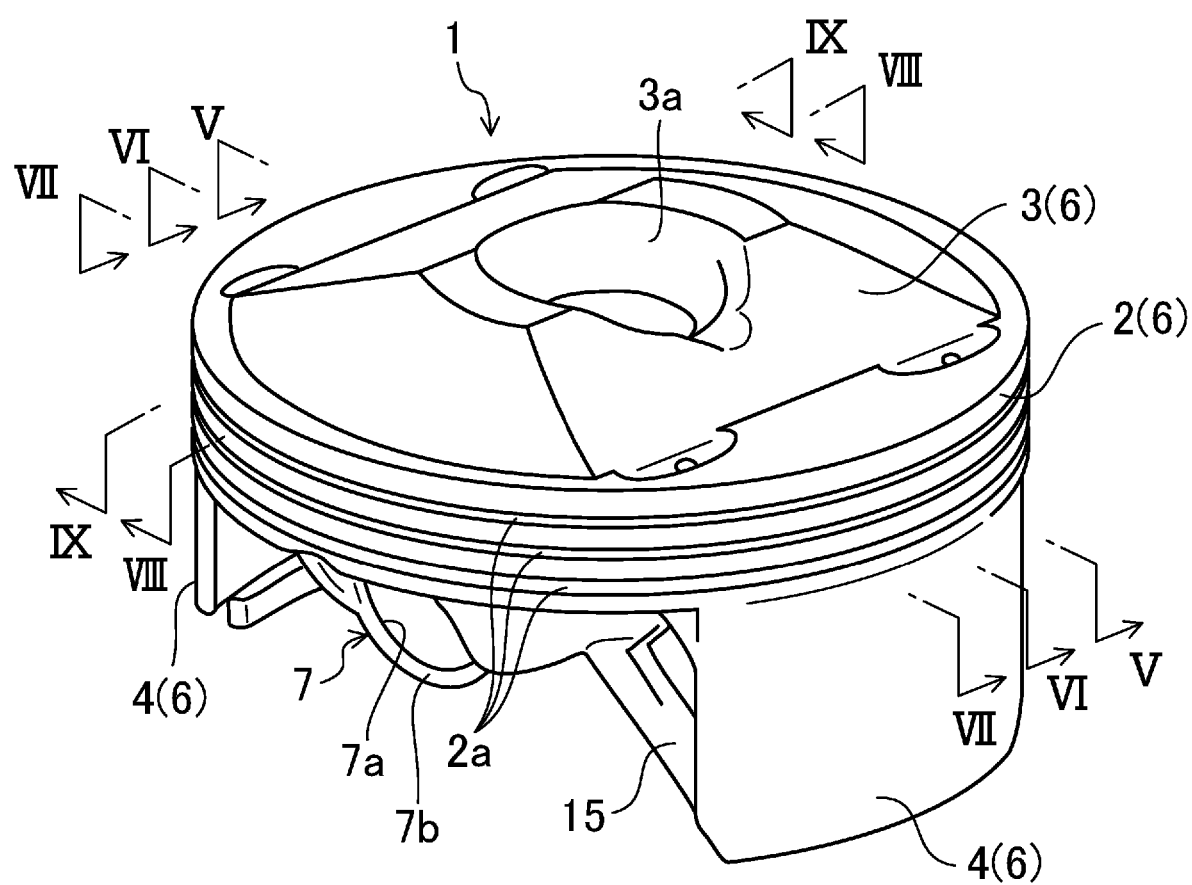
FIG. 1 is a perspective view illustrating an engine piston to which a piston structure according to an exemplary first embodiment is applied.
Figure 2:
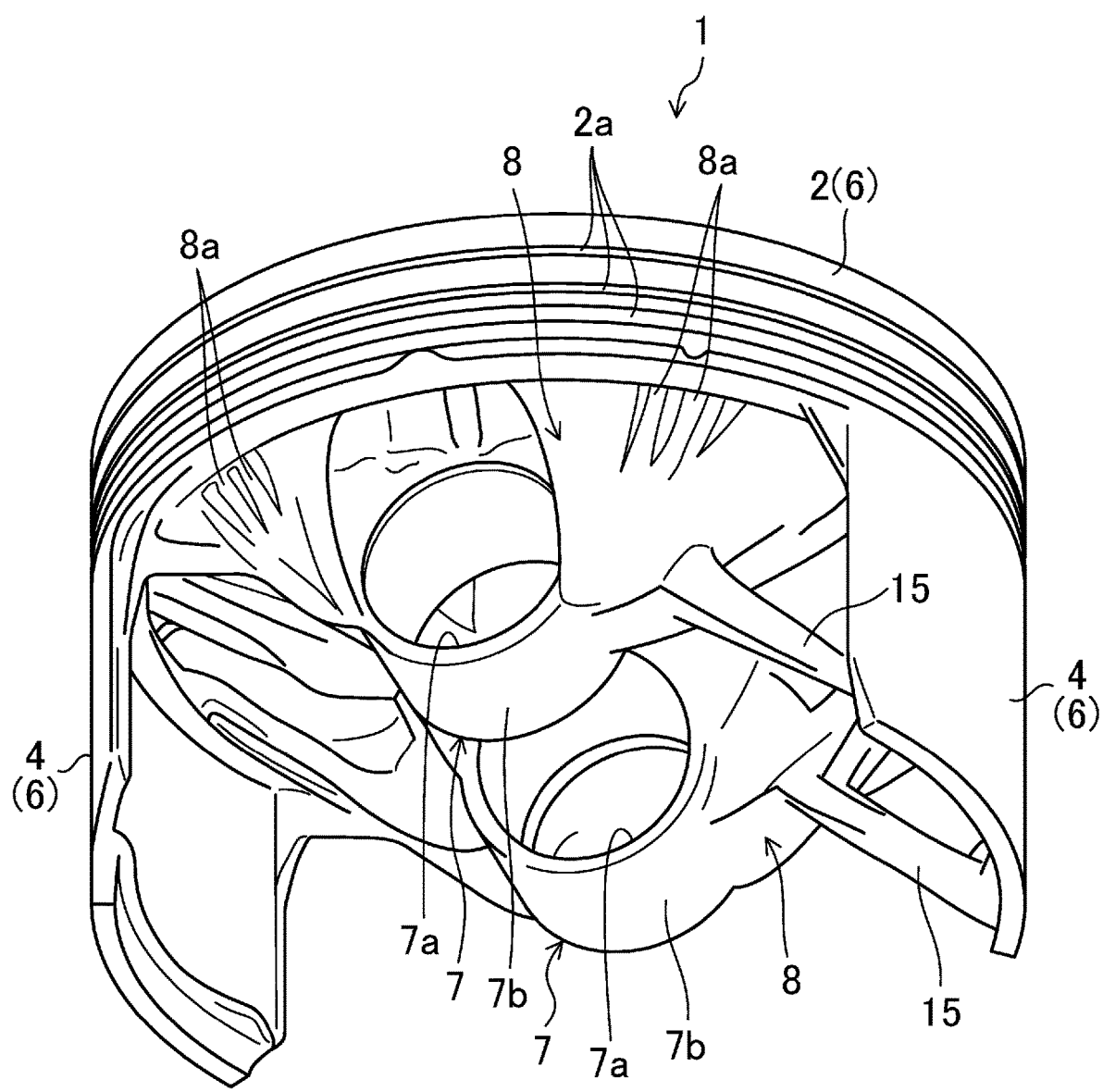
FIG. 2 is a perspective view of the piston as viewed from a different direction from that in FIG. 1.
Figure 3:
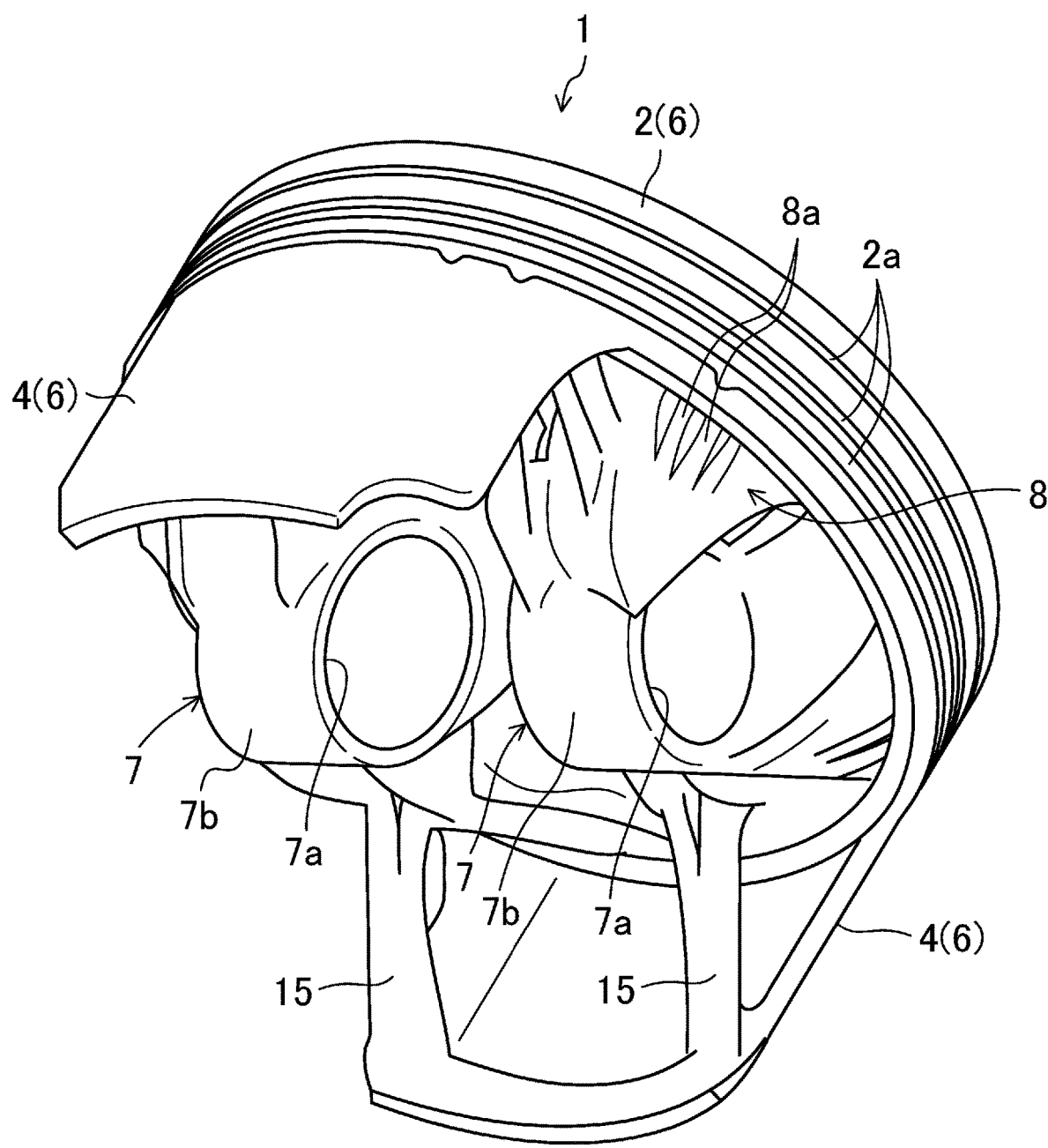
FIG. 3 is a perspective view of the piston as viewed from a different direction from that in FIGS. 1 and 2.
Figure 4:
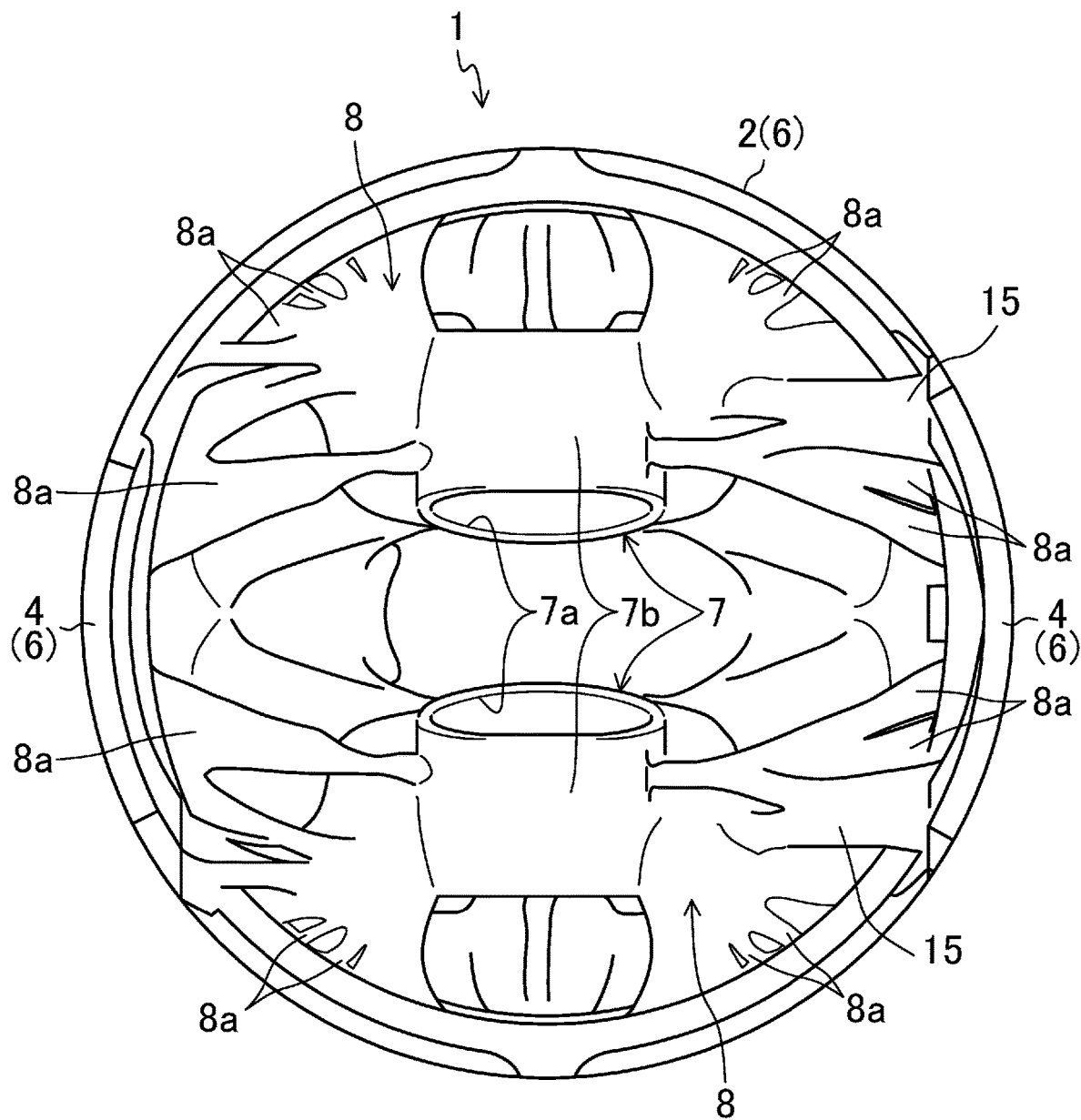
FIG. 4 is a bottom view of the piston from below.

Exemplary embodiments will now be described in detail with reference to the drawings.

First Embodiment

FIGS. 1 to 9 show an engine piston 1 to which a piston structure according to an exemplary first embodiment is applied. The piston 1 repeats a cylinder cycle (an intake stroke, a compression stroke, a combustion stroke, i.e., an expansion stroke, and an exhaust stroke) to reciprocate in a cylinder which is not shown along the cylinder axis (consistent with the central axis of the piston 1 (upwardly and downwardly in FIGS. 5 to 9)).

The upper portion of the piston 1 includes a cylindrical portion 2 sliding along the inner peripheral wall surface of the cylinder, and a piston crown 3 closing the upper opening of the cylindrical portion 2. The piston crown 3 except its outer peripheral portion is associated with the pent-roof shape of a combustion chamber and protrudes upward. The middle portion of the piston crown 3 is provided with a cavity 3a. The outer peripheral surface of the cylindrical portion 2 is provided with a plurality of recessed grooves 2a (three in this embodiment) into which a piston ring that is not shown is fitted, the recessed grooves 2a being formed along the entire periphery.

The lower portion of the piston 1 (below the cylindrical portion 2) is provided with two piston skirts 4 facing each other in a radial direction of the piston and in a direction perpendicular to a central axis of a pair of piston pin supporters 7 which will be described later (substantially consistent with the central axis of a piston pin which will be described later).

The cylindrical portion 2, the piston crown 3, and the piston skirt 4 constitute an outer peripheral portion 6. The outer peripheral portion 6 is formed along the outer shape of the piston 1, and has a predetermined thickness. The outer peripheral portion 6 is solid.

The pair of piston pin supporters 7 substantially cylindrically shaped, and having peripheral walls 7b with a predetermined thickness are provided between the two piston skirts 4. Both ends of the piston pin (not shown) are inserted (fitted) into insertion holes 7a having a circular cross section and defined by the peripheral walls 7b of the pair of the piston pin supporters 7. The pair of the piston pin supporters 7 support the piston pin at both ends of the piston pin. The pair of the piston pin supporters 7 are coaxially disposed, and the central axes of them coincide with each other. The pair of the piston pin supporters 7 are spaced apart from each other along the central axes of the piston pin supporters 7. The respective peripheral walls 7b (a portion between the outer and inner peripheral surfaces of the piston pin supporters 7) of the piston pin supporters 7 are solid just like the outer peripheral portion 6.

The outer peripheral portion 6 and the peripheral walls 7b of the piston pin supporters 7 may have respective thicknesses (predetermined thicknesses) enough to be able to reduce the weight of the piston 1 as much as possible while keeping the shape of the piston 1 and supporting the piston pin. The thickness of the outer peripheral portion 6 and the thickness of each of the peripheral walls 7b of the piston pin supporters 7 do not have to be constant. The outer peripheral portion 6 and/or at least one of peripheral walls 7b of the piston pin supporters 7 may be partially thin or thick.

The middle portion of the piston pin in the longitudinal direction (a portion corresponding to a space between the pair of the piston pin supporters 7) is coupled to a small end, i.e., one end of a connecting rod which is not shown, as well known. A large end, i.e., the other end of the connecting rod is coupled to a crankshaft which is not shown. The reciprocating motion of the piston 1 is transferred to the crankshaft through the connecting rod to allow the crankshaft to rotate. The central axial direction of the piston pin (i.e., the central axial direction of the piston pin supporter 7) coincides with the axial direction of the crankshaft.

Figure 10:
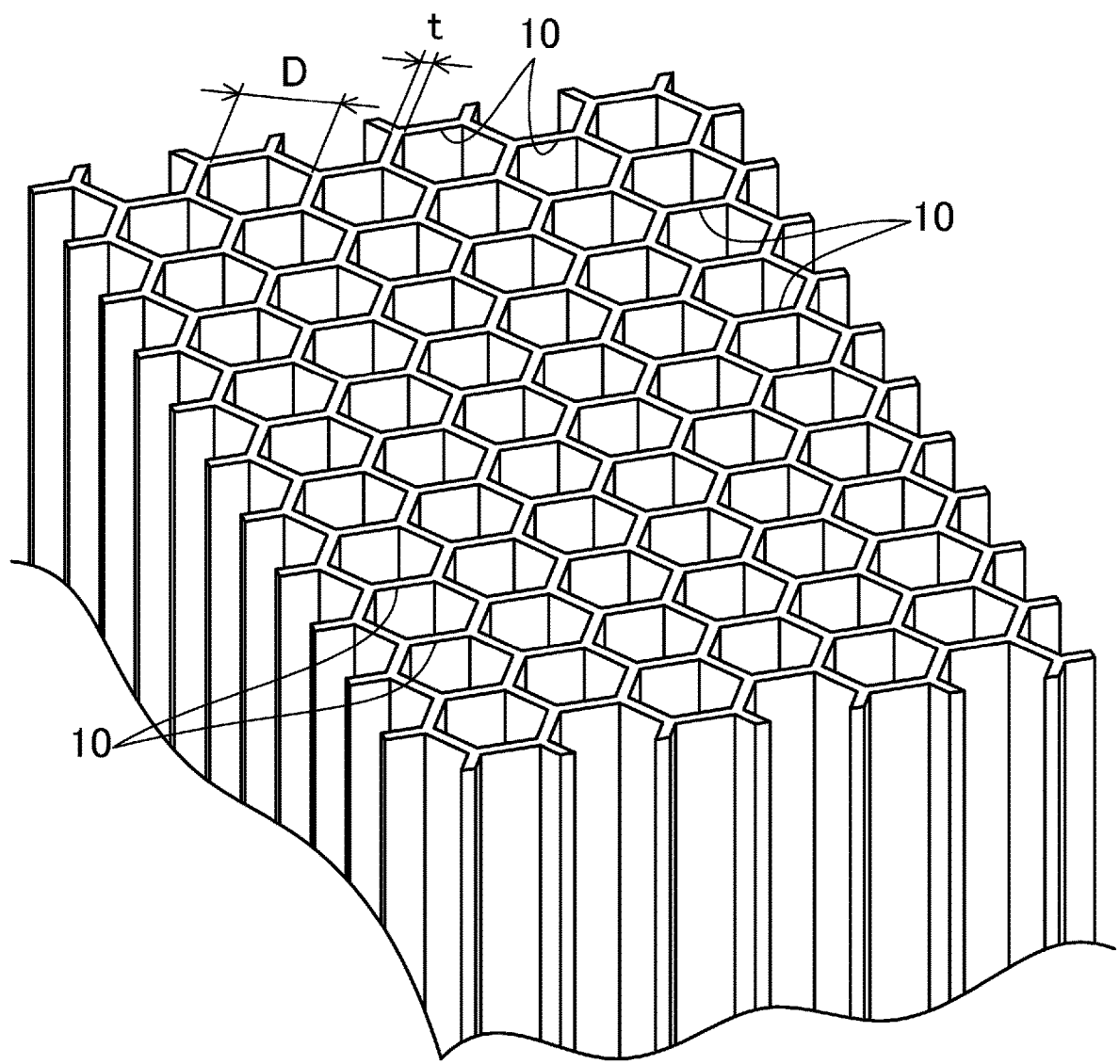
FIG. 10 is a perspective view illustrating a honeycomb structure.
Figure 11:
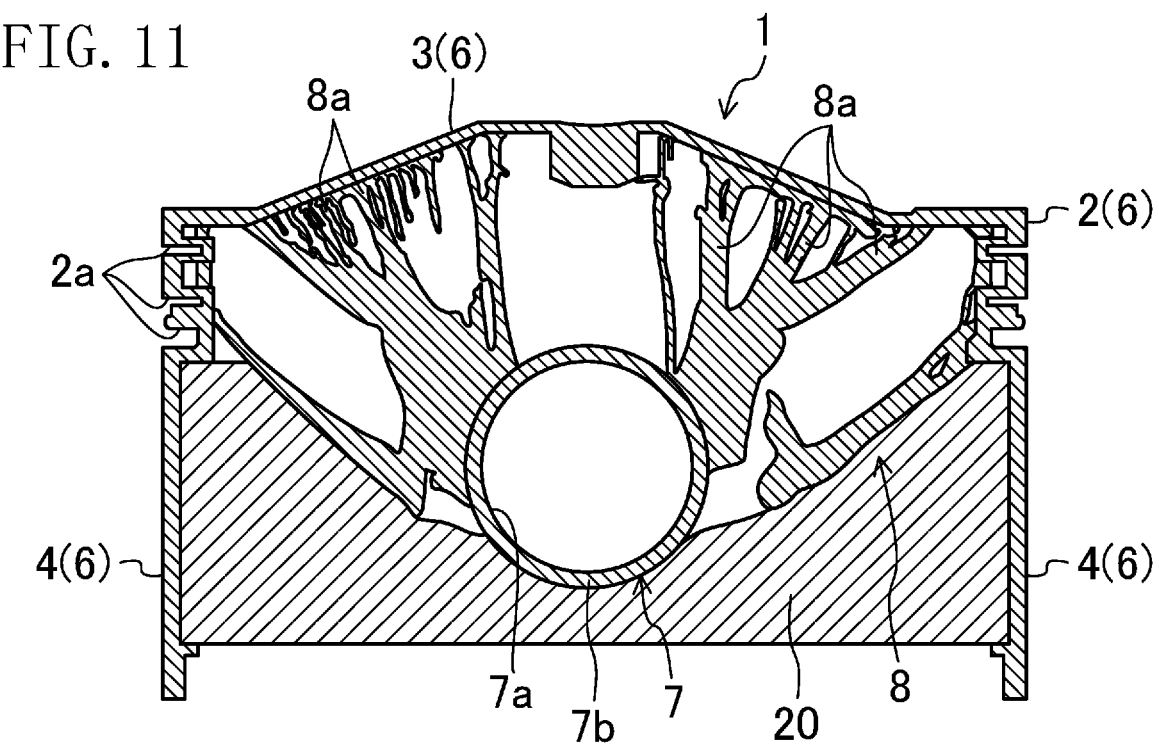
FIG. 11 illustrates an engine piston to which a piston structure according to an exemplary second embodiment is applied, and corresponds to FIG. 5.
Figure 12:
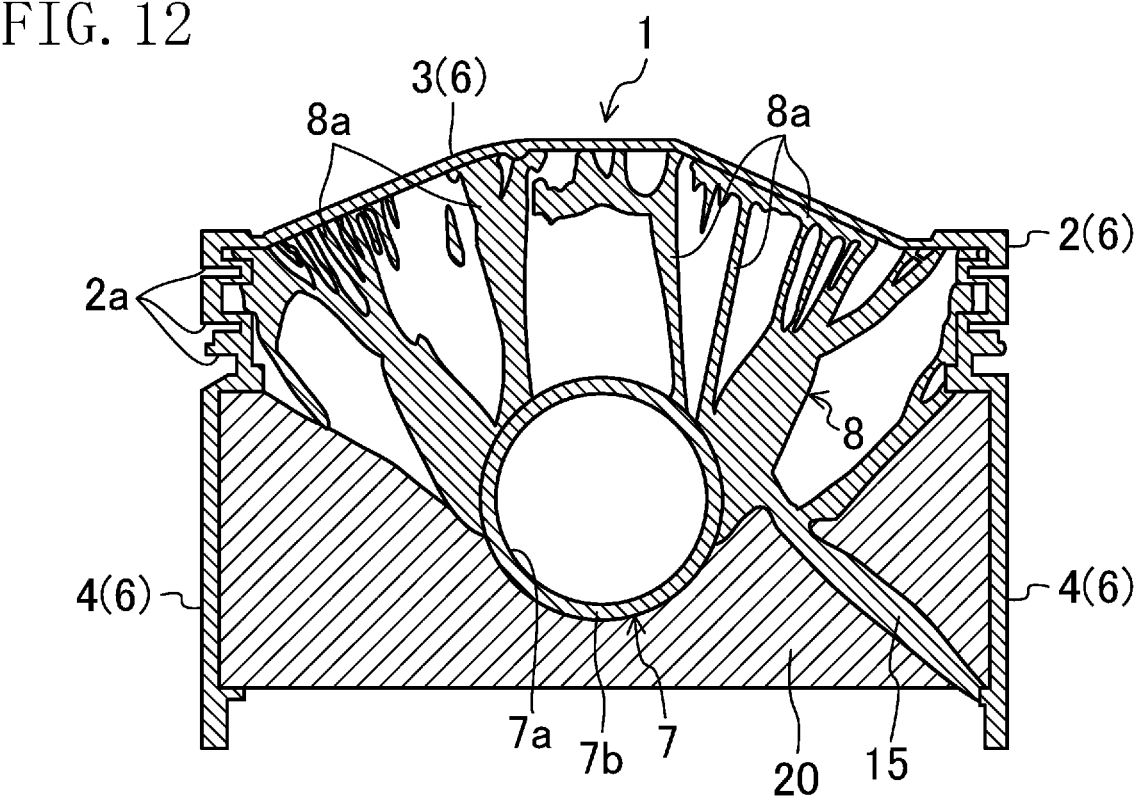
FIG. 12 corresponds to FIG. 6 in the second embodiment.
Figure 13:
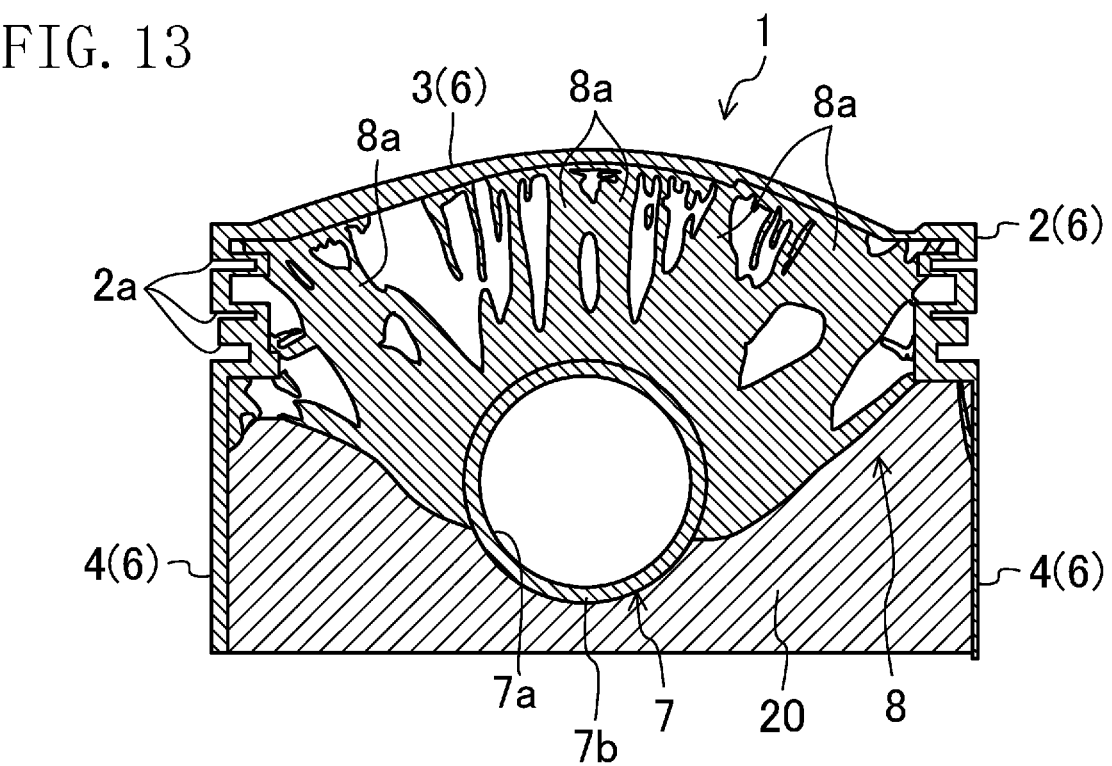
FIG. 13 corresponds to FIG. 7 in the second embodiment.

The piston 1 is provided with couplers 8 each coupling a corresponding one of the pair of the piston pin supporters 7 (peripheral walls 7b) to the outer peripheral portion 6. These couplers 8 do not have a solid structure but have a porous structure in which hollow portions are formed. In this embodiment, each coupler 8 has a hollow honeycomb structure as shown in FIG. 10. In this hollow honeycomb structure, the honeycomb holes 10 are the hollow portions. A diameter D of the inscribed circle of the honeycomb hole 10 (a distance between two sides of a hexagon that is the periphery of the honeycomb holes 10) is preferably 1 mm or more and 3 mm or less. An interval t between two adjacent honeycomb holes 10 is preferably 0.2 mm or more and 0.5 mm or less.

Figure 5:
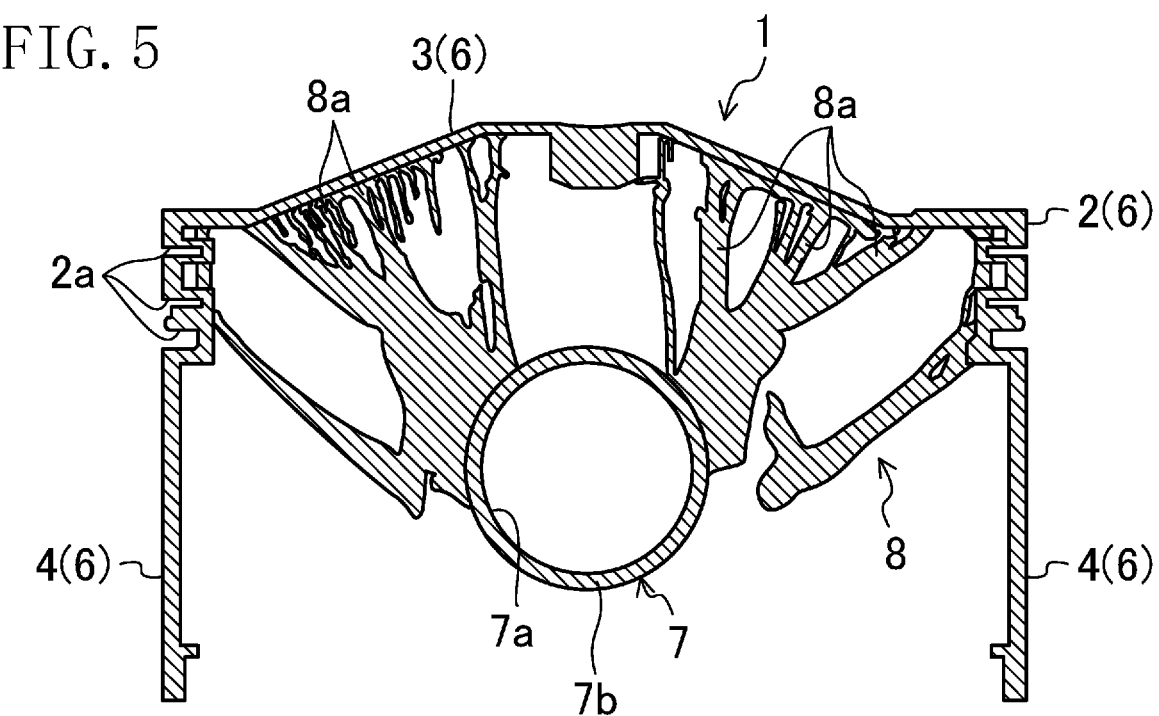
FIG. 5 is a cross-sectional view taken along line V-V of FIG. 1.
Figure 6:
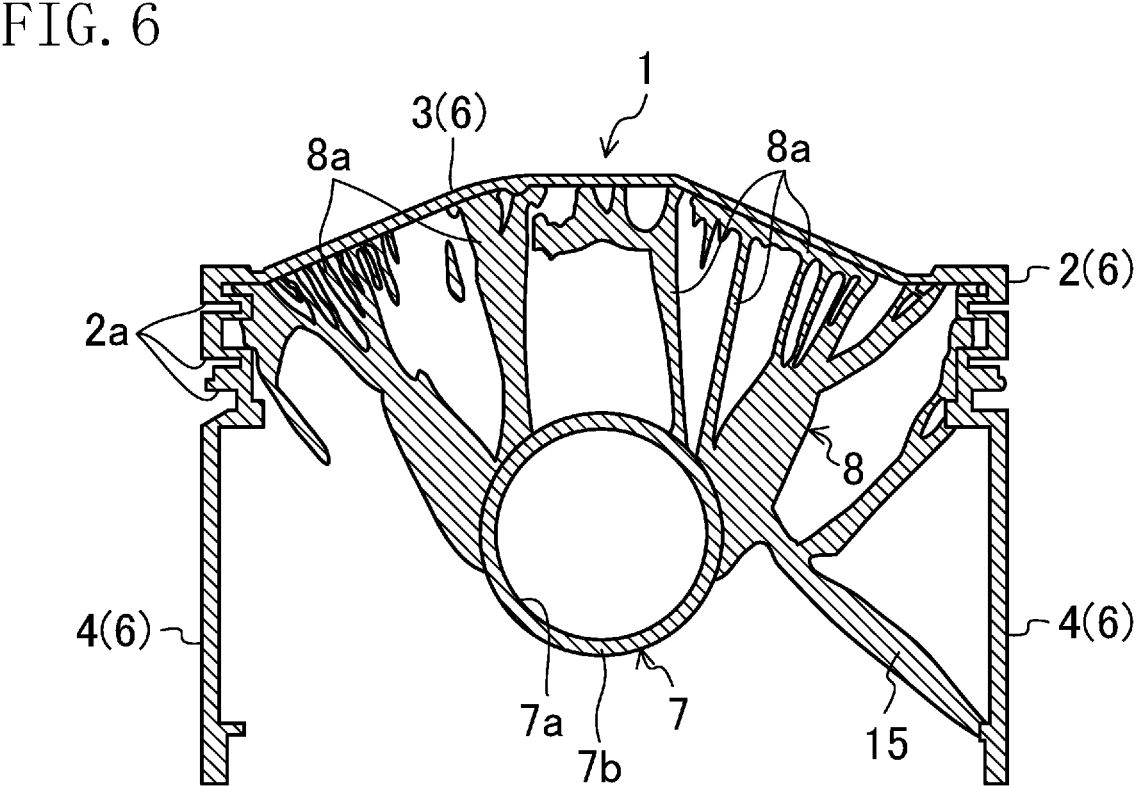
FIG. 6 is a cross-sectional view taken along line VI-VI of FIG. 1.
Figure 7:
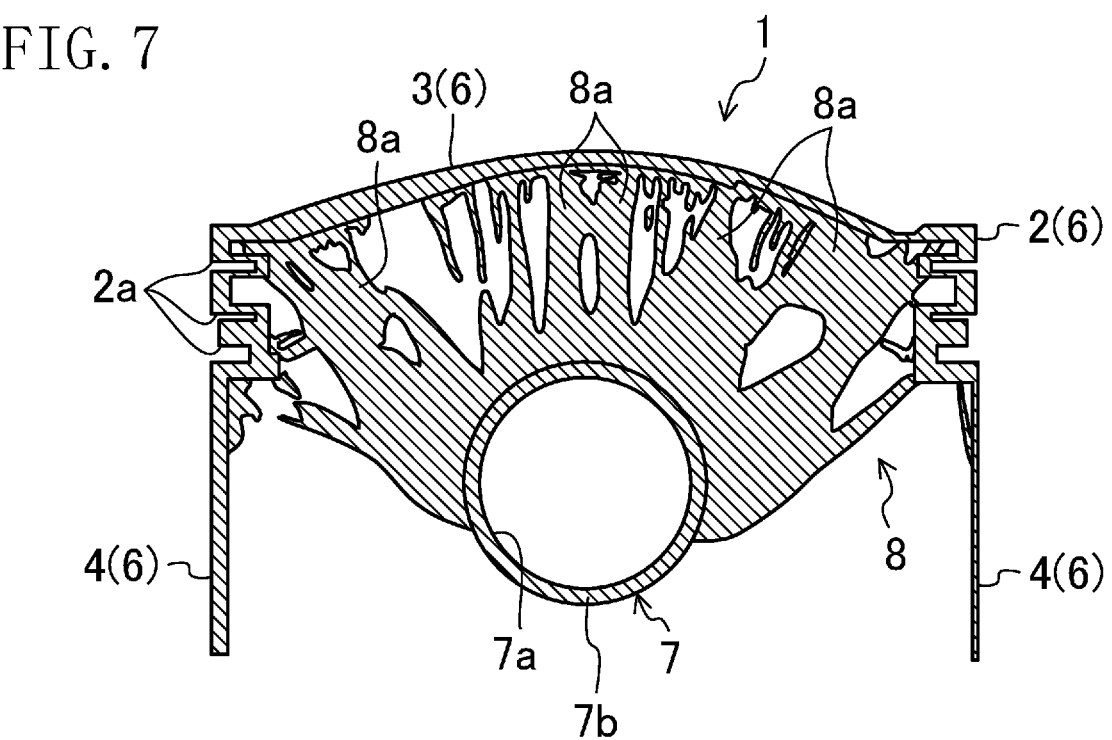
FIG. 7 is a cross-sectional view taken along line VII-VII of FIG. 1.
Figure 8:
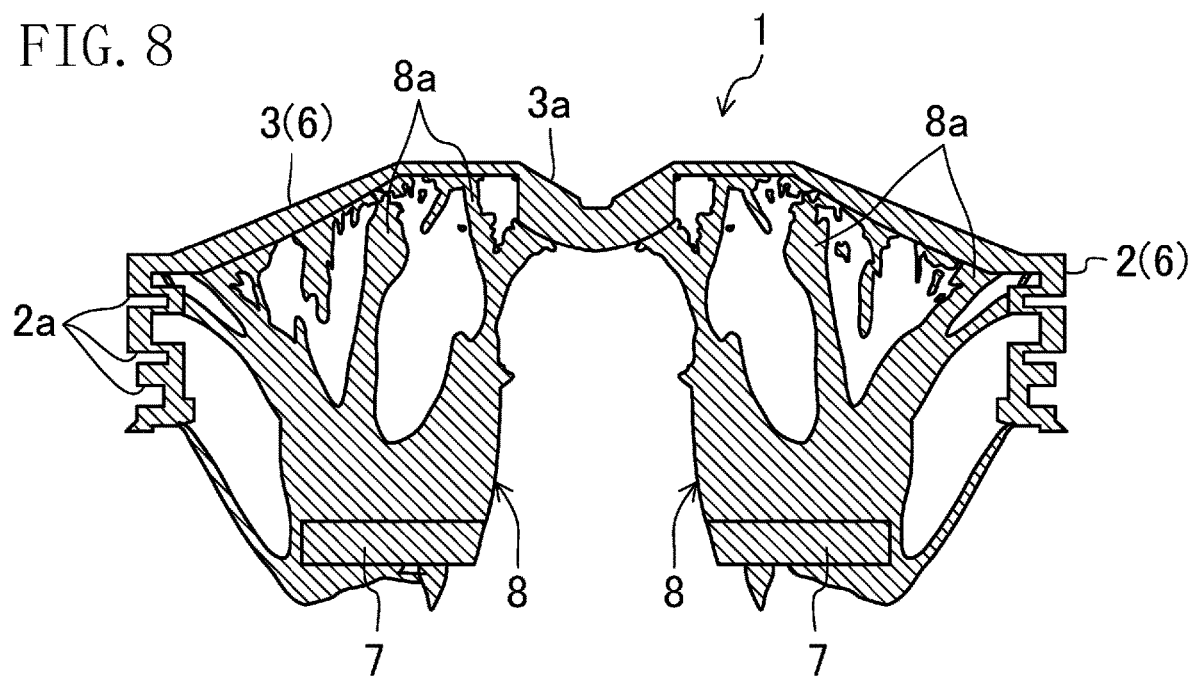
FIG. 8 is a cross-sectional view taken along line VIII-VIII of FIG. 1.
Figure 9:
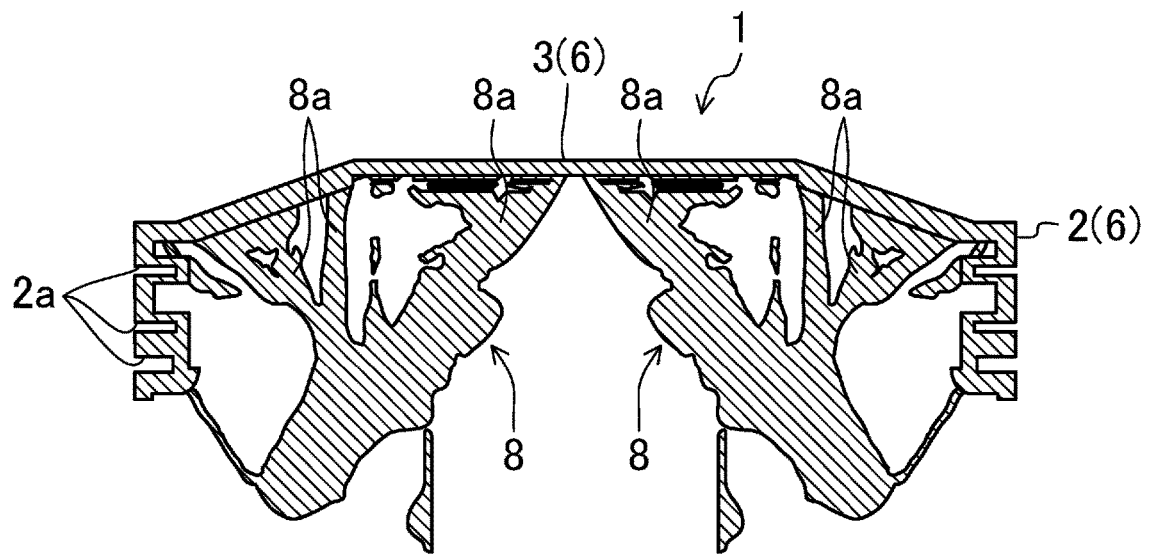
FIG. 9 is a cross-sectional view taken along line IX-IX of FIG. 1.

Each coupler 8 supporting the piston pin supporter 7 on the outer peripheral portion 6 includes a plurality of radial extensions 8a extending radially from the peripheral wall 7b of each piston pin supporter 7 toward the outer peripheral portion 6 (in particular, see FIGS. 5 to 7 viewed from the central axial direction of the piston pin supporter 7). In this embodiment, portions of the radial extensions 8a adjacent to the piston pin supporter 7 are connected together. All the radial extensions 8a include the hollow honeycomb structure. The hollow honeycomb structure of each radial extension 8a is provided such that the honeycomb holes 10 extend in a direction in which the radial extension 8a extends. The hollow honeycomb structure is formed in the entire of each of the radial extensions 8a along the direction in which the radial extension 8a extends. This hollow honeycomb structure is advantageous because it can improve strength and rigidity of the radial extensions 8a while reducing the weight of the radial extensions 8a.

This embodiment is provided with a reinforcing portion 15 coupling the portion of the radial extension 8a adjacent to the piston pin supporter 7 to the lower end of the piston skirt 4. That is to say, due to the relation with the rotational direction of the crankshaft, the pair of the piston pin supporters 7 are slightly displaced from the central axis of the piston 1 toward the left or right side (the left side in FIG. 6) when viewed from the central axial direction of the piston pin supporter 7. Therefore, the reinforcing portion 15 is provided to reinforce some radial extensions 8a located at a portion of the piston pin supporter 7 further from the piston skirt 4 (the right side in FIG. 6). Just like the radial extensions 8a, the reinforcing portion 15 also has the hollow honeycomb structure, and the honeycomb holes 10 extend in a direction in which the reinforcing portion 15 extends. Note that the reinforcing portion 15 is not necessarily needed.

The outer peripheral portion 6, the piston pin supporter 7, the coupler 8, and the reinforcing portion 15 (all elements of the piston 1) are made of a metal material (an aluminum alloy in this embodiment), and are integrally formed together. If no reinforcing portion 15 is provided, the outer peripheral portion 6, the piston pin supporter 7, and the coupler 8 are made of a metal material, and are integrally formed together.

In order to manufacture such a piston 1, a metal layer manufacturing machine (a metal 3D printer) is used. That is to say, the piston 1 is formed by a three-dimensional layer manufacturing process. Specifically, for example, layers are formed and stacked one-by-one from a side closer to the piston crown 3 of the piston 1. In each of the layers, metal powder having a particle size of, e.g., 20 μm or more and 125 μm or less is uniformly spread, and the arranged metal powder except a portion associated with the honeycomb holes 10 is irradiated with a laser light to be sintered. At that time, the portion associated with the honeycomb holes 10 is not irradiated with the laser light, and the metal powder at this portion remains. The remaining metal powder is finally removed from a separately provided hole. As can be seen, the piston 1 is manufactured in which the outer peripheral portion 6, the piston pin supporter 7, the coupler 8, and the reinforcing portion 15 are integrally formed together.

Accordingly, in this embodiment, the outer peripheral portion 6 and the peripheral walls 7b of the piston pin supporters 7 are solid, and the couplers 8 have a porous structure in which hollow portions (the honeycomb holes 10) are formed. The outer peripheral portion 6, the piston pin supporter 7, and the coupler 8 (and the reinforcing portion 15) are made of a metal material, and are integrally formed together. This can reduce the weight of the piston 1, and the honeycomb holes 10 can absorb vibration and noise during the operation of the piston 1. The outer peripheral portion 6 and the peripheral walls 7b of the piston pin supporters 7 have respective thicknesses enough to be able to reduce the weight of the piston 1 as much as possible while keeping the shape of the piston 1 and supporting the piston pin. This can reduce the weight of the piston 1 as much as possible while maintaining the necessary function of the piston 1. Furthermore, the reduced weight of the piston 1 increases a resonance frequency, thereby reducing generation of vibration and noise caused by resonance. Therefore, even if a combustion pressure rise rate or the maximum value of a combustion pressure in the engine is increased, the NVH of the engine 1 can be reduced.

In this embodiment, the couplers 8 have the hollow honeycomb structure, and this hollow honeycomb structure coupler 8 is provided to the whole of the radial extensions 8a so as to extend in the extending direction of the radial extensions 8a. This can improve strength and rigidity of the radial extensions 8a to improve supporting rigidity of the piston pin supporter 7 for the outer peripheral portion 6. In addition, it is possible to reduce the weight of the radial extensions 8a, i.e., the weight of the piston 1 while improving strength and rigidity of the radial extensions 8a.

Second Embodiment

FIGS. 11 to 15 show an exemplary second embodiment (the same components that have been described in FIGS. 5 to 9 are designated by the same reference characters, and are not described in detail). The second embodiment has the same configuration as the first embodiment, except that a sound absorber (lower and upper sound absorbers 20 and 25 which will be described later) is added to the configuration of the first embodiment.

Figure 16:
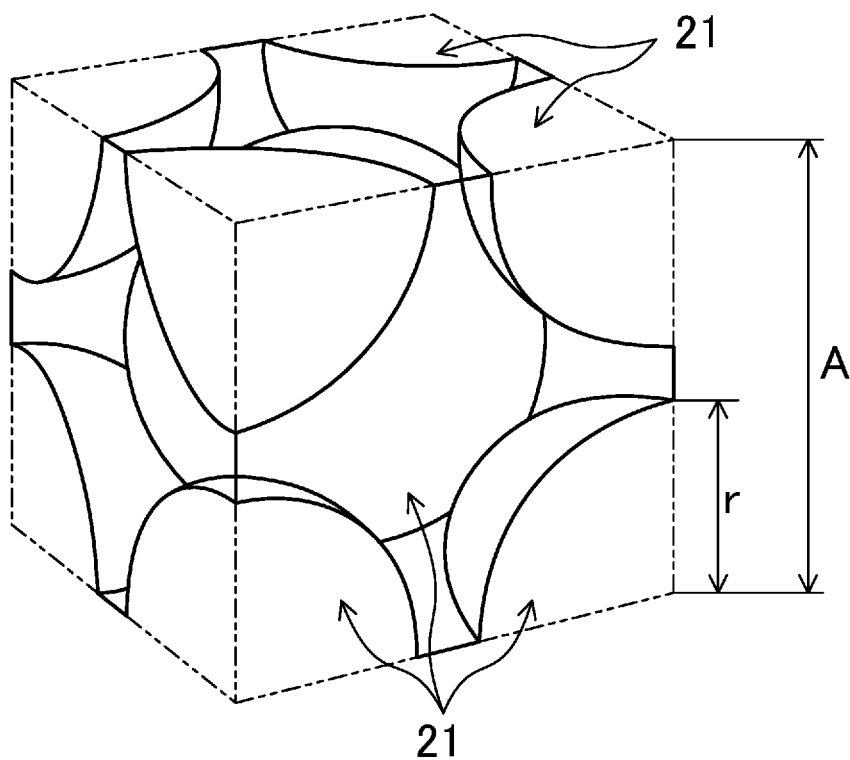
FIG. 16 is a perspective view illustrating a sound absorber having a structure in which hollow portions are arranged in a body-centered cubic lattice.

That is to say, in this embodiment, the lower sound absorber 20 is provided below the pair of the piston pin supporters 7 and the couplers 8. This lower sound absorber 20 has, as shown in FIG. 16, a structure in which spherically shaped hollow portions 21 are arranged in a body-centered cubic lattice. A length A of one side of the cubic unit lattice is preferably 1.5 mm or more and 4 mm or less, and a radius r of the hollow portion 21 is preferably 0.5 mm or more and 2 mm or less according to the value of the length A.

The lower sound absorber 20 is provided to the substantially entire space below the pair of the piston pin supporters 7 and the couplers 8 except a space passing through the gap between the pair of the piston pin supporters 7 and extending in a direction perpendicular to the central axis of the piston pin supporters 7 (including the space where the small end of the connecting rod is disposed).

Figure 17:
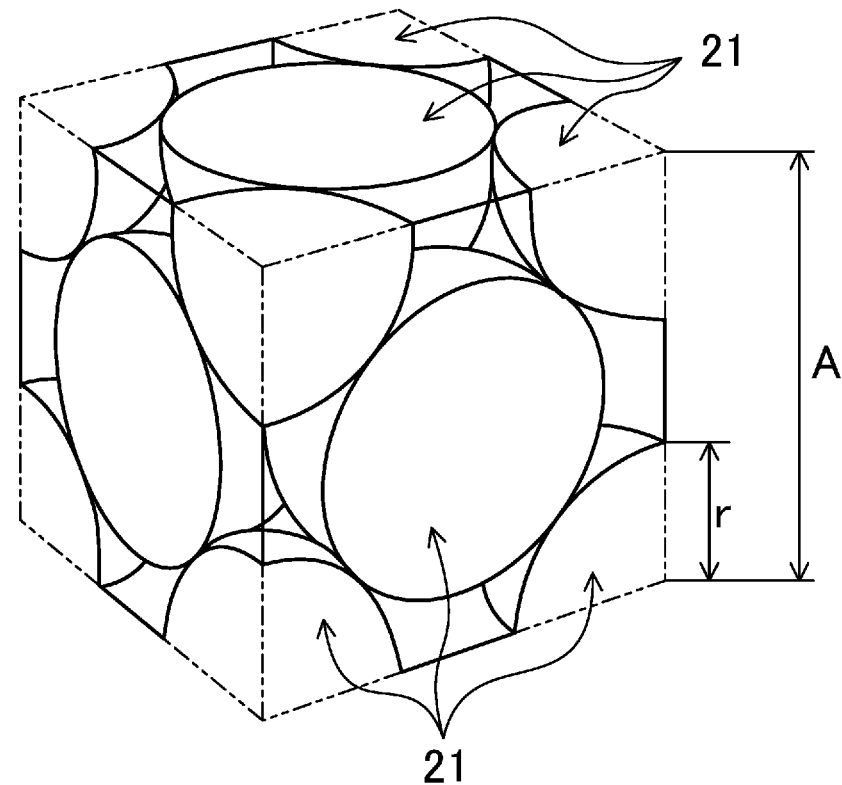
FIG. 17 is a perspective view illustrating a sound absorber having a structure in which hollow portions are arranged in a face-centered cubic lattice.

Note that the lower sound absorber 20 may have a structure in which spherically shaped hollow portions 21 are arranged in a body-centered cubic lattice, as shown in FIG. 17. In this case, the length A of one side of the unit lattice and the radius r of the hollow portion 21 may be the same as or similar to those in the body-centered cubic lattice structure.

Figure 14:
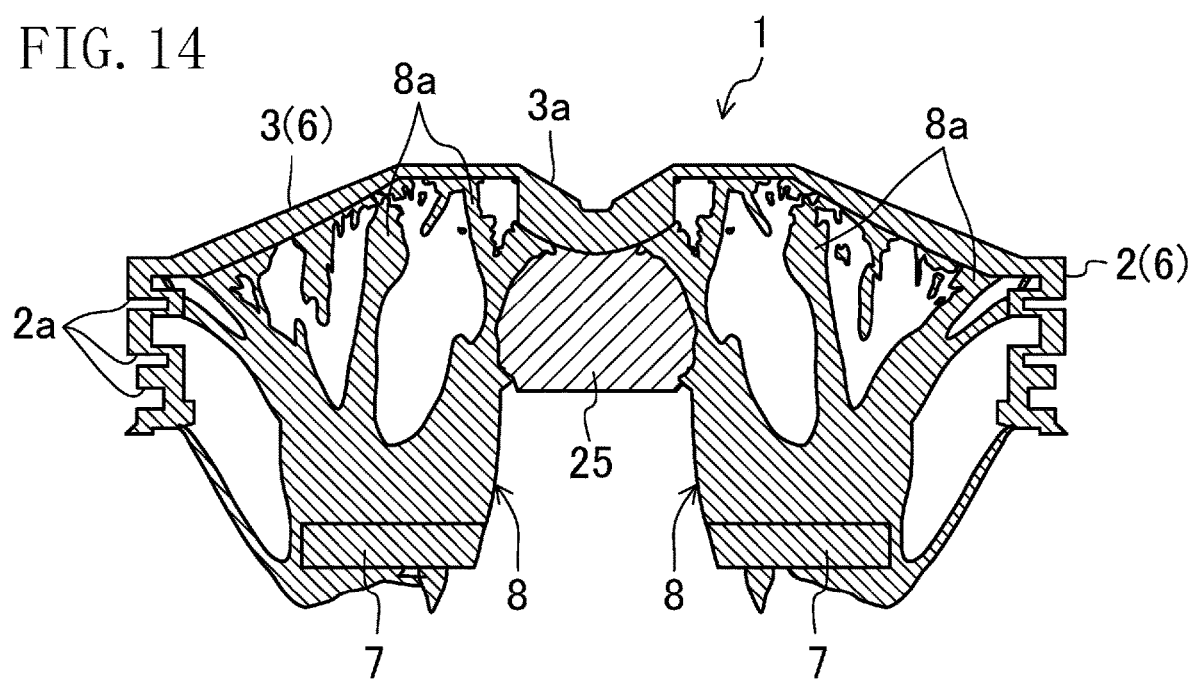
FIG. 14 corresponds to FIG. 8 in the second embodiment.
Figure 15:
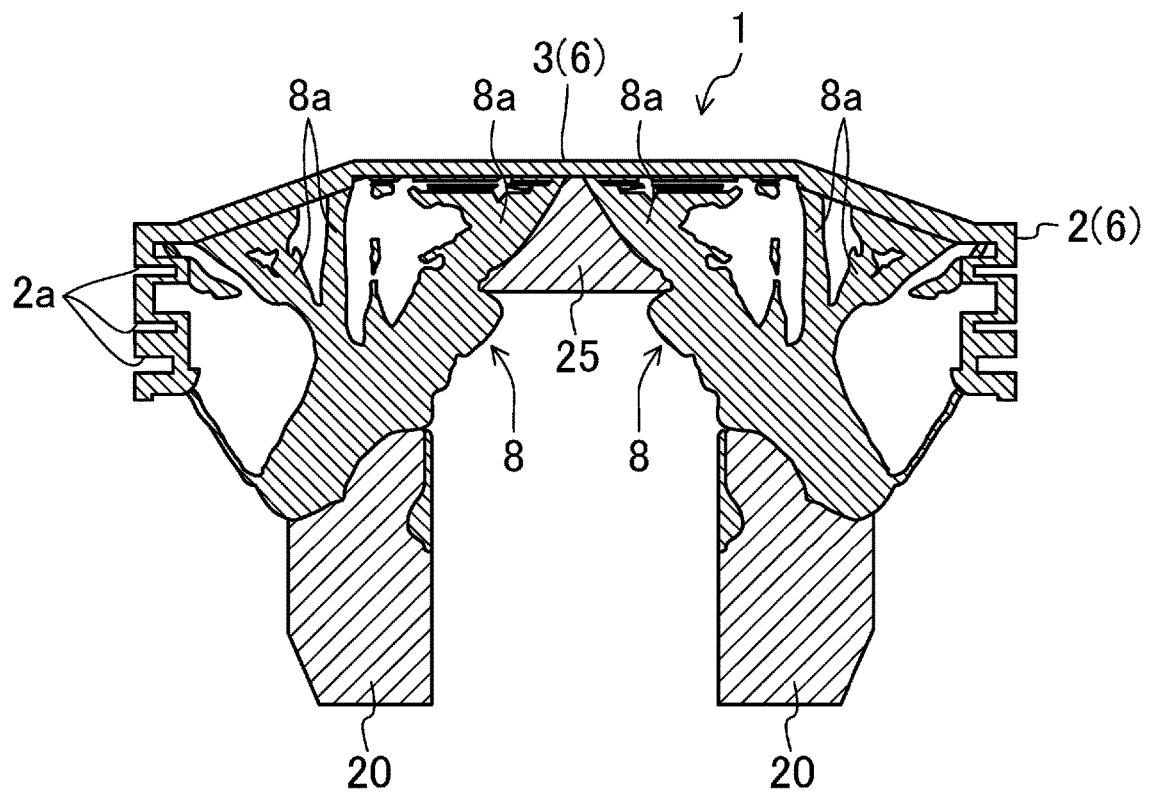
FIG. 15 corresponds to FIG. 9 in the second embodiment.

In this embodiment, the upper sound absorber 25 is provided to a portion above the space passing through the gap between the pair of the piston pin supporters 7 and extending in the direction perpendicular to the central axis of the piston pin supporters 7 (a portion not interfering with the small end of the connecting rod) (see FIGS. 14 and 15). This upper sound absorber 25 is integrally fixed to the rear surface (the lower surface) of the piston crown 3 and portions of the inner peripheral surface of the cylindrical portion 2, the portions facing each other in a direction perpendicular to the central axial direction of the piston pin supporters 7. Just like the lower sound absorber 20, the upper sound absorber 25 also has a structure in which hollow portions are arranged in a body-centered cubic lattice (or a face-centered cubic lattice). Note that the upper sound absorber 25 is not necessarily needed, and may be omitted.

The lower and upper sound absorbers 20 and 25 are made of a metal material (an aluminum alloy), and are integrally formed with the outer peripheral portion 6, the piston pin supporters 7, the couplers 8, and the reinforcing portion 15.

Just like in the first embodiment, the piston 1 can be manufactured using a metal layer manufacturing machine (a metal 3D printer).

Accordingly, in this embodiment, the hollow portions 21 of the lower sound absorber 20 have the body-centered cubic lattice structure. The hollow portions 21 can further absorb noise during the operation of the piston 1 while reducing the weight of the piston 1.

The present invention is not limited to the embodiments described above. Any change can be made within the scope of the claims as appropriate.

For example, in the above embodiments, the couplers 8 (all the radial extensions 8a) have the hollow honeycomb structure. Instead of the hollow honeycomb structure, for example, the hollow portions may have a body-centered or face-centered cubic lattice structure, or the hollow portions may be disposed randomly. All the radial extensions 8a may have the hollow structure and another structure such as a body-centered or face-centered cubic lattice structure, or a structure in which the hollow portions are disposed randomly. Not all the radial extensions 8a have the hollow honeycomb structure. Alternatively, some of the radial extensions 8a may have the hollow honeycomb structure, and the other radial extensions 8a may have another structure.

The foregoing embodiments are merely preferred examples in nature, and the scope of the present invention should not be interpreted in a limited manner. The scope of the present invention is defined by the appended claims, and all variations and modifications belonging to a range equivalent to the range of the claims are within the scope of the present invention.

INDUSTRIAL APPLICABILITY

The present invention is useful for an engine piston structure, and in particular, is useful in a situation where a combustion pressure rise rate or the maximum value of a combustion pressure in the engine is increased, thereby achieving significantly improved, high thermal efficiency of the engine.

DESCRIPTION OF REFERENCE CHARACTERS

1 Piston
6 Outer Peripheral Portion
7 Piston Pin Supporter
7a Insertion Hole
7b Peripheral Wall
8 Coupler
8a Radial Extension
10 Honeycomb Hole
20 Lower Sound Absorber

The invention claimed is:

1. An engine piston structure comprising:
an outer peripheral portion formed along an outer shape of the piston, and having a predetermined thickness;
a pair of piston pin supporters cylindrically shaped, and having peripheral walls with a predetermined thickness, the piston pin supporters supporting a piston pin of which both ends are inserted into insertion holes defined by the peripheral walls of the pair of the piston pin supporters; and
couplers each coupling the pair of piston pin supporters to the outer peripheral portion, wherein
the outer peripheral portion and the peripheral walls of the piston pin supporters are solid,
each of the couplers has a porous structure in which hollow portions are formed,
the outer peripheral portion, the pair of piston pin supporters, and the couplers are made of a metal material and are integrally formed together, and
each of the couplers has a hollow honeycomb structure.

2. The engine piston structure of claim 1, wherein
each of the couplers supporting the piston pin supporters on the outer peripheral portion includes a plurality of radial extensions extending radially from the peripheral walls of the piston pin supporters toward the outer peripheral portion,
at least one of the radial extensions of each of the couplers has the hollow honeycomb structure, and
the hollow honeycomb structure of the radial extensions is disposed such that honeycomb holes serving as the hollow portions extend in a direction in which the radial extensions extend.

3. An engine piston structure comprising:
an outer peripheral portion formed along an outer shape of the piston, and having a predetermined thickness;
a pair of piston pin supporters cylindrically shaped, and having peripheral walls with a predetermined thickness, the piston pin supporters supporting a piston pin of which both ends are inserted into insertion holes defined by the peripheral walls of the pair of the piston pin supporters; and
couplers each coupling the pair of piston pin supporters to the outer peripheral portion, wherein
the outer peripheral portion and the peripheral walls of the piston pin supporters are solid,
each of the couplers has a porous structure in which hollow portions are formed,
the outer peripheral portion, the pair of piston pin supporters, and the couplers are made of a metal material and are integrally formed together, and
a sound absorber is provided below the pair of piston pin supporters and the couplers, and has a structure in which hollow portions are arranged in a body-centered cubic lattice or a face-centered cubic lattice.

4. The engine piston structure of claim 1, wherein
a sound absorber is provided below the pair of piston pin supporters and the couplers, and has a structure in which hollow portions are arranged in a body-centered cubic lattice or a face-centered cubic lattice.

5. The engine piston structure of claim 2, wherein
a sound absorber is provided below the pair of piston pin supporters and the couplers, and has a structure in which hollow portions are arranged in a body-centered cubic lattice or a face-centered cubic lattice.

* * * * *